United States Patent [19]

Banker

[11] 4,330,338

[45] May 18, 1982

[54] PHARMACEUTICAL COATING COMPOSITION, AND PREPARATION AND DOSAGES SO COATED

[75] Inventor: Gilbert S. Banker, Lafayette, Ind.

[73] Assignee: Purdue Research Foundation, West Lafayette, Ind.

[21] Appl. No.: 152,872

[22] Filed: May 23, 1980

Related U.S. Application Data

[63] Continuation of Ser. No. 947,948, Oct. 2, 1978, abandoned.

[51] Int. Cl.$^3$ .................. C08L 1/28; C08L 1/14; C08L 39/06; C08L 31/04
[52] U.S. Cl. .................. 106/197 C; 106/169; 106/170; 106/197 R; 424/33; 424/35; 524/312; 524/385; 524/388; 524/377; 524/490
[58] Field of Search ............ 424/33, 35; 260/17 R, 260/9, 13, 29.6 WA, 29.6 RW; 106/169, 170, 197

[56] References Cited

U.S. PATENT DOCUMENTS

| | | | |
|---|---|---|---|
| 3,449,489 | 6/1969 | Gaunt | 424/35 |
| 3,522,070 | 7/1970 | Webb | 106/170 |
| 3,539,380 | 11/1970 | Johnson | 424/35 |
| 3,640,741 | 2/1972 | Etes | 424/35 |
| 3,935,326 | 1/1976 | Groppenbacher et al. | 424/35 |
| 4,177,177 | 12/1979 | Vanderhoff et al. | 260/29.2 M |
| 4,252,786 | 2/1981 | Weiss et al. | 424/35 |

*Primary Examiner*—V. P. Hoke
*Attorney, Agent, or Firm*—John R. Nesbitt; Robert E. Harris

[57] ABSTRACT

Pharmaceutical coatings in the form of aqueous dispersion of a water insoluble polymer prepared by dissolving the polymer in a water immiscible organic solvent, emulsifying the organic solution in water, optionally with the aid of additives, and stripping the organic solvent from the system to provide a colloidal, or near colloidal, aqueous dispersion or latex of small, even sized polymeric particles which are applied to pharmaceutical dosages from highly loaded latices. The latexes, which display resistance to bacterial and mold growth and, when combined with selected additives, provides convenient, attractive coating compositions which afford excellent protection and varied release properties to pharmaceutical dosages.

6 Claims, No Drawings

PHARMACEUTICAL COATING COMPOSITION, AND PREPARATION AND DOSAGES SO COATED

CROSS-REFERENCE TO RELATED APPLICATION

This application is a continuation of applicant's co-pending prior application Ser. No. 947,948 filed Oct. 2, 1978, now abandoned.

BACKGROUND OF THE INVENTION

1. Field of the Invention

The invention relates generally to pharmaceutical coatings, and more particularly to a pharmaceutical tablet, capsule, bead or particulate coating in the form of an aqueous latex of water insoluble polymeric compositions, and to solid pharmaceutical dosages coated with such materials.

2. Discussion of the Prior Art

The use of various coatings to seal pharmaceutical (including vitamins and food suppliments) dosages has been known for some time. Many ends have been served by such coatings. For instance, tablet coatings provide a more attractive appearing dosage, protect the dosage from attack, such as by moisture during storage, provide a more acceptable feed, and often taste, to the user of the dosage, and, with selected compounding, provides either gastric and/or enteric dissolution at varying rates to determine the time and rate at which the dosage is released.

Early coatings include natural and synthetic polymers such as cellulose acetate phthalate and shellac to, as the primary purpose, delay release of the dosage thus providing enteric dosage. Sugar coating of the dosage is a classic example of an early pharmaceutical tablet coating affording gastric release, but has the drawback of being a very involved process requiring highly skilled operators. As a result of the various advantages and disadvantages of known coatings for pharmaceutical dosages, film coatings applied to the dosages from organosols, i.e., from solutions of plasticized polymers and organic solvents, have become the most utilized procedure. Film coatings from organosols provide rapid, simple, effective coating of the dosage and control over the dosage size, coating disintegration and dissolution rates, and generally results in an attractive and desirable dosage coating. Generally, the organic solvents curtailed bacterial and mold growth.

A number of disadvantages have also been attendant to the organosol coatings of pharmaceutical dosages. Often the vapors of the organic solvents are toxic or flammable thereby providing a hazard to the operators-though the solvents may be fully or substantially driven from the tablet coating providing no hazard to the user of the pharmaceutical dosage. Also, organic solvents present an environmental hazard and, accordingly, require recovery systems which are both expensive and complicated. As a result, in an effort to reduce the amount of solvents employed in film coating, fillers and extenders are often added to the film coating formulations. While this results in an increased solids loading of the coating dispersion, the additives and extenders often compromise the performance of the tablet coating in terms of mechanical properties and permeability. Except in high volume operations, the cost of recovery equipment for the organic solvents often proves prohibitive despite the high cost of the solvents recovered by such systems for recycling. Independent of the fundamental economics of such recovery systems, the demands of environmentally responsible manufacturing often mandate such solvent recovery systems with resulting adverse impacts on the economics of many film coating operations.

While the European pharmaceutical industry has employed two aqueous based synthetic polymer dispersions for the coating of pharmaceutical dosages, i.e., Eudragit E-30D, a 70:30 ratio of ethylacrylate-methyl methacrylate copolymers with a preferred molecular weight of about 800,000; and Eudragit L-30D, a 50:50 ratio of methacrylic acid-ethyl acrylate copolymers with a preferred molecular weight of 250,000, which are produced by emulsion polymerization, these compounds are subject to bacterial and mold growth while in aqueous form.

Water, of course, is an excellent solvent or vehicle for many practical purposes in that it is nonflammable and thus provides no explosion hazard, is low cost, is substantially free of toxic effects and innocuous to the environment. Unfortunately, the use of aqueous solutions of polymers for film coating to provide dosage coatings is quite limited due to the very low solids contents, i.e., on the order of 7% to 15% of known aqueous solutions. As the concentration of solids rises, the viscosity of the solution rapidly approaches an inoperable condition. Similarly, an increase in the molecular weight of the polymer in an aqueous solution rapidly causes an unworkably high viscosity. Thus relatively low molecular weight polymers and low concentrations are normally required. These characteristics result in a need for a plurality of layers of polymer to be built up in order to obtain a coating of adequate thickness for surface protection. Multiple coatings involve a long processing time which is complicated further by the slow evaporation of water and large amounts of water which must be removed from each coating. Further, many drugs are sensitive to water when exposed to high concentrations for extended periods of time and, accordingly, require initial sealing with water barriers, such as the shellac coating, prior to coating with the conventional aqueous film coating.

Another serious drawback with existing water-based coating systems is the tendency for bacteria and molds to multiply and grow in aqueous media, either solvent or vehicle. This tendency has been observed in the abovementioned Eudragit compositions. Thus care in storage and attention to shelflife are of critical importance in avoiding septic conditions in known aqueous based coating systems.

Still another problem with the low solids aqueous film coating techniques now known is the relatively poor film obtained. Few water soluble materials provide the desired film coatings properties. The more desirable film obtainable with the use of longer chains, higher molecular weight polymers cannot be employed in the conventional aqueous coating methods.

SUMMARY OF THE INVENTION

This invention includes coatings for pharmaceutical solid dosages in which one or more water insoluble polymers are formed into a colloidal, or near colloidal, aqueous dispersion of such polymers by first dissolving the polymer in an organic solvent more volatile than water, emulsifying the solution thus formed in a continuous water phase—optionally with the aid of an emulsifying agent—and thereafter stripping the organic solvent from the emulsion to form very small, i.e., on the order of 0.1 to 10 microns, and up to 15 to 20 microns, even sized particles of the polymeric composition which particles are maintained as a substantially stable dispersion in the aqueous medium, hereafter referred to as a latex. Tablet coating is accomplished by adding selected constituents to the latex and applying such dispersion having high solids loading to pharmaceutical dosages by conventional means in a coating pan or by more specialized procedures, i.e., immersion coating, fluidized beds, etc. U.S. Pat. No. 3,896,762 discusses a workable coating apparatus.

Water immiscible polymers suitable for use with the istant invention include ethyl cellulose, polyvinyl acetate phthalate, cellulose acetate phthalate, hydroxy propyl methyl cellulose phthalate, maleic anhydride copolymers, including poly (methyl vinyl ether/maleic anhydride) i.e., the Gantrez Series, ethylene maleic anhydride, styrene maleic anhydride, and various straight chain and branched alkyl esters of Maleic anhydride copolymers, including ethyl, propyl, butyl etc. to $C_{18}$ alkyl half esters, and butyl, isobutyl etc. to $C_{18}$ alkyl quarter esters. Acrylic/acrylate copolymers or acrylate polymers, including Eudragit E-30D and Eudragit L-30D, as described above, and biodegradable polymers, including polylactic acid, d and l (+ and −), polylactic/polyglycolic acid copolymer, polypeptides such as glutamic acit/leucine copolymer, glycolides, -propiolactone, tetramethylglycolide, -butyrolactone, -butyrolactone, povalolactone, and cyclic esters of -hydroxybutyric acid, -hydroxyisobutyric acid, -hydroxyl methyl-valeric acid, -hydroxyliquocenic acid, -phenyl lactic acid, and -hydroxy ethylbutyric acid. Many water immiscible solvent systems are appropriate for use in the present invention. Primarily, the solvents or solvent systems must have a substantial solvent effect upon the polymers employed, and preferably be quite volatile relative to water in order to leave little residue in the final latex or, alternatively, have permissible residue limits for use in foodstuffs. Typical solvents include chloronated solvents such as ethylene dichloride, tetrachloroethylene, chloroform, methelene chloride and similar solvents, aliphatic, alicyclic or aromatic hydrocarbons such as hexane, esters such as ethyl acetate, higher alcohols, ethers, and combinations thereof, or combinations of such solvents with polar water misable solvents such as acetone or lower alcohols in ratios which produce an overall mixed solvent which is water immiscible. Isopropanol and methylene chloride, ethylene dichloride or chloroform, for instance, constitute an excellent water immiscible solvent system for hydroxypropyl methyl cellulose phthalate. Spice oleoresins are examples of solvents having permissible residue limits in foodstuffs. Numerous other solvent systems will be apparent to those skilled in the art.

It is often desirable to include surfactants or emulsifiers to assist in producing a stable emulsion. The emulsifiers may be anionic such as sodium lauryl sulfate (USP), cationic such as the quaternary ammonium halides (such as cetyl pyridinium chloride) or non-ionic such as linear fatty alcohol ethoxylates (exemplified by Alkasurf LA3, LA7, LA9 or LA12 available from Alkanol Chemical Ltd of Mississauga, Ont. Canada) or the polyoxyethylene condensation products (exemplified by Spans and Tweens or polyoxyethylenepolypropylene glycol as Pluronic F68, available from Wyandotte Chemicals Corp., Wyandotte, Mich.). Other agents including materials such as polyglycerol esters of fatty acids, polyoxethylene sorbitan monolaurate, polyoxethylene sorbitan tristearate, polyoxethylene sorbitan monostearate, polyoxyethylene sorbitan monoleate, propylene glycol mono and diesters of fats and fatty acids, sodium lauryl sulfate and sorbitan monostearate are useful to serve such functions. Generally, the emulsions and latices of the instant invention can be formed without surfactants or emulsifiers, but in many instances, finer particle size and greater stability are attained with such additives. The particular above-listed bio-degradable polymers form emulsions and resulting latices without benefit of additives.

Various other additives, such as cetyl alcohol, beeswax, (yellow, bleached or white and white natural), candelilla wax, carnauba wax, cocoa butter, fatty acids such as those in the food additives, mono, di and tri glycerides (including glyceryl monostearate, monooleate, etc. and self-emulsifying glyceryl monostearate), glycerol-lacto stearate, oleate or palmitate (other self emulsifying waxes), glyceryl-lacto esters of fatty acids (also self emulsifying) lauric acid, lauryl alcohol, linoleic acid, octyl alcohol and acetate, and paraffin may be advantageously included to enhance the properties of the emulsion. A number of additives such as carnauba wax and chlorowax improve the appearance of the tablet coating. These, of course, can be added to the latex as polishing agents.

Preferable, the resulting latex includes between 10 percent to 60 percent solids, optionally 40 to 50 percent, or more, solids with low, workable viscosities and non-Newtonian dilutant flow. Concentration of the water insoluble polymer in the organic solvent generally is in the range of 10 percent to 50 percent by weight, but higher concentrations are sometimes workable and desirable, provided unduly high viscosities are not produced. Surfactants/emulsifier concentrations in the emulsions may of course be zero in some instances, but when included are within the general range of 0.1 percent to 10 percent by weight, and preferable 0.5 to 2 percent. Other additives may be included in amounts between 0 percent and 20 percent by weight of the emulsion, but usually between 0 percent and 10 percent by weight of the emulsion.

The resulting latex of water insoluble polymers does not in itself usually yield the desired dosage coating composition. Annealing agents, particularly water soluble polymers such as hydroxypropyl cellulose, hydroxypropyl methylcellulose, methyl cellulose, methyl ethyl cellulose, polyvinylpyrrolidone and/or sodium carboxymethylcellulose are often desirable additives. Gums, including official gums, such as pectin acacia-USP, tragacanth-USP, as well an non-official gums such as karaya, locust bean, chondrus, and alginic acid derivatives, etc. may also be employed as annealing agents, though generally the aforementioned annealing agents are preferred. Other materials of possibly desirable application, though believed to be less desirable than those first listed, include high molecular weight carboxy vinyl polymer such as Carbopol 934 available from BF Goodrich Company, provided it is employed in amounts not above 2 or 3% concentration and is neutralized with a sodium hydroxide to be solubilized as a sodium salt. Hydroxyethyl cellulose, available as Cellosize from Union Carbide Company, sodium alginate, propylene glycol ester of alginic acid, available as Kelgin, and Kelcoloid respectively from the Delco Chemical Company, polyvinyl alcohol. Also, as an example of a low molecular weight annealing agent which is not polymeric, dioctyl sodium sulfocuccinate-USP, may, in some instances, be employed. In general, annealing agents are recognized by those skilled in the art for the properties of being water soluble, suitable for ingestion, and compatible with the basic latex. Often, plasticizers are necessary to provide workable coatings. Typical plasticizers include propylene glycol, glycerin, Triacetin, (glyceryl triacetate) available from Eastman Kodak, and polyethylene glycol.

Therefore, an object of this invention is to provide aqueous dispersions for tablet coatings utilizing high molecular weight, water insoluble polymers heretofore applicable primarily by means of organosols.

It is a further object of this invention to provide more economical dosage coatings utilizing water as a dispersing medium.

It is another object of the present invention to provide environmentally acceptable dosage coatings.

It is still another object of the present invention to provide aqueous vehicle coating latices having resistance to the growth of bacteria, molds and other such objectionable matter therein.

These and other objects and advantages of the instant invention will become evident upon further consideration of the specification and the appended claims.

DETAILED DESCRIPTION OF THE INVENTION

According to the instant invention, high solids loading latices suitable for formulating dosage coating compositions are formed by dissolving one or more relatively high molecular weight, water insoluble polymers, in a water immiscible organic solvent or solvent system. The thus formed organic solvent solution is emulsified to form an aqueous emulsion having a continuous water phase. Generally, emulsification is accomplished by initial mixing by physical agitation and then fine dispersion by sonification and/or homogenization to form the emulsion. Optionally, additives, surfactants and emulsifying agents may be added to aid in establishing and stabilizing the emulsion, but such agents tend to be of relatively low volatility. Thus, in many instances, such additives must be acceptable in the tablet coating ultimately formed. Many acceptable agents for these purposes are known. Sufficiently stable emulsions are generally formed by subjecting the organic solvent solution and water to comminuting forces by means of devices such as colloid mills, ultrasonic vibrators, homogenizers, etc. These are well know in the art of emulsification. Preferably, the emulsion is subjected to such treatment promptly upon formation of the crude emulsion.

It is not absolutely necessary that the emulsion be stable for extended periods since it is desirable that the organic solvent be promptly stripped from the emulsion. This, in the case of marginally stable emulsions, can be carried out promptly. While it is preferred that a vacuum distillation process be employed, particularly in the instance of unstable emulsions, steam distillation, either with or without vacuum, may be employed to remove the more volatile organic solvents from the emulsion.

As the organic solvent is removed, the polymer initially dissolved therein forms discrete solid particles. These particles generally are on the order of 0.1 to 20 micron average particle size, and generally below 10 microns. Also, the particles generally are of consistent size as a result of the homogeneous nature of the emulsion from which the particles are formed, though minor amounts of particles up to 15 or 20 microns may be present.

The essentially submicron size of the polymeric particles in the remaining aqueous phase gives rise to a latex having on the order of 10 percent to 60 percent solids and preferably 40 percent to 50 percent solids loading with low viscosities and non-Newtonian dilatant flow.

A number of additives may be incorporated in the latex according to the instant invention to provide enhanced dosage coating characteristics. For instance, plasticizers such as Triacetin, propylene glycol or glycerine, and annealing agents such as water soluble polymers often must be incorporated individually or in combination depending upon the film characteristics desired. Pigments, release agents, and polishing agents may also be included to vary the properties, i.e., gastric release, enteric release, rapid dissolution and appearance of the coating.

The various advantages and properties of the dosage coatings in accord with the latex forming process abovedescribed will be apparent from the following examples.

EXAMPLE 1

A basic latex was formed by dissolving 60 grams of ethyl cellulose having a degree of substitution of between 2.44 and 2.58 and an ethoxyl content of 48 to 49.5 percent in 240 grams of an 85 to 15 ratio of benzene ethanol solvent. The solution was allowed then to stand overnight and was then filtered through surgical gauze. 3.3 grams of n-decane was then added. The resulting solution of the water insoluble ethyl cellulose in the water immiscible solvent system was added drop by drop at 55° C. to an aqueous solution of 4 grams of sodium laurylsulfate in 600 grams of water. A reflex condenser was attached to the flask in which the crude emulsion was formed and a marine propeller type agitator was employed to mix the solutions. The resulting emulsion was promptly submitted to ultrasonic agitation at the rate of 120 watts for 5 minutes and passed through a two stage laboratory homogenizer at 6000 psi. Thus a direct emulsification of the ethyl cellulose and water immiscible solvents was produced. Thereafter, the organic solvent was removed by vacuum distillation in a rotary evaporator at 25 inches of mercury and 45° C. after adding 0.5 grams of a silicone antifoam. As the organic solvent was removed, a stable pseudolatex of essentially submicron particles of ethylcellulose was formed in the aqueous vehicle.

EXAMPLE 2

Sixty grams of ethylcellulose was dissolved in 440 grams of ethylene dichloride, filtered through surgical gauze and 13 grams of cetyl alcohol was then added to the solution. The resulting solution of a water insoluble ethyl cellulose polymer in a water immiscible organic solvent was placed in a 2000 ml. 3 neck flask equipped with a reflex condenser and a marine propeller type agitator. Four grams of sodium lauryl sulfate was added to 600 grams of water and the thus formed aqueous solution was added drop by drop to the organic solution through a separatory funnel to form a continuous aqueous phase emulsion by inverse emulsification. The thus formed crude emulsion was subjected to ultrasonic agitation and homogenization as described in Example 1, and the organic solvent was similarly removed to form a latex of micron or submicron size of ethyl cellulose particles in an aqueous vehicle.

EXAMPLE 3

One hundred grams of cellulose acetate phthalate was added to 700 grams of an 80 to 20 ratio of ethyl acetate-isopropanol solvent. The solution was filtered and 14 grams of cetyl alcohol added. Thereafter, a solution of six grams of sodium lauryl sulfate in 1000 grams of water was added to form an emulsion as set forth in Example 2, and a latex was formed by removing the organic solvent in the manner set forth in Example 2. The resulting latex was stable and of micron or submicron particle size.

EXAMPLE 4

A solution of 10 grams of polymethyl vinyl ether-maleic anhydride copolymer (Gantrez AN 169 available from GAF Chemical Company) was added to 100 grams of an ethyl acetate solvent. A latex of micron or submicron sized particles of the copolymer was formed in conjunction with a solution of 1.5 grams of sodium lauryl sulfate in 300 grams of water by the emulsification process and removal of the organic solvents as described in Example 2.

EXAMPLE 5

Ten grams of a polymer of 90 percent L-Lactic Acid and 10 percent glycolic acid having a molecular weight of 15,000 was added to 90 grams of chloroform. A stable, micron or submicron latex of the polymer was formed in conjunction with the solution of 1 gram of fatty alcohol ethoxylate (Alkasurf LA 3) and 200 grams of water in the manner described with reference to the emulsification and separation described in Example 2.

EXAMPLE 6

Ten grams of L-Polyactic acid having a molecular weight of 15,000 was added to 90 grams of chloroform. A stable, micron or submicron latex of the polymer was formed in conjunction with an aqueous solution identical to that utilized in Example 5 by utilizing the emulsification and organic solvent removal step described in Example 2.

All of the latices produced as described in Examples 1 through 6 were stable, micron or submicron sized latices of water insoluble polymers in aqueous vehicles. Formulation of other latices utilizing water insoluble polymers which do not form latices by more conventional emulsification or colloid forming methods can be produced by methods essentially similar to those described above. Of course, differing polymers may require appropriate organic solvent systems, and such solvent systems would be water immiscible, and may require the addition of emulsifying agents and other additives. However, the nature of such solvents and additives are well recognized in the art and may be identified without undue experimentation.

However, though the latices as produced in Example 1 through 6 have the properties of stable, high solids loading in a aqueous vehicle and are resistant to bacterial and mold growth, such latices are not necessarily appropriate for producing tablet coatings. The suspended polymers are, of course, water insoluble and thus not readily dissolvable in gastric liquids, though this quality can be put to advantage for enteric release in many instances. Further, such latices generally form marginal films, and in many cases are not film forming at all. When film is formed, often the films are not of sufficient physical integrity or attractiveness to function as a tablet coating.

To produce a dosage coating as is the object of the present invention, plasticizers, annealing agents, usually in the form of water soluble polymers which may be incorporated into the water phase of the latex, and/or pigments and other additives may be added to the latices. Such other additives, which include polishing agents, release agents, etc. may be incorporated at various points in the formulation process, i.e., prior to emulsification or after formulation of the latex.

EXAMPLE 7

Latices formed as set forth in Example 1 were placed in petri dishes and the solvents evaporated, at 30° C., both without and with plasticizers in varying amounts to form films. The plasticizers added were U.S.P. Grade propylene glycol, glycerin, Triacetin, and polyethylene glycol. The results obtained are shown in Table I.

TABLE I

| Plasticizer | % Plasticizer on Polymer Weight Basis | % Total Polymers | Film Characteristics |
|---|---|---|---|
| None | 0 | 44 | Hard, Brittle, glass like and transparent. Discontinuous. |
| Polyethylene glycol | 67 | 22.3 | Discontinuous, hard and brittle. |
| Propylene glycol | 40 60 80 | 22.3 | Hard divided into small pieces. Discontinuous. |
| Glycerin | 55 | 25.5 | Translucent, soft and discontinuous. |
| Glycerin | 67.5 | 24.6 | Translucent, soft. Continuous. The film has a waxy texture. |
| Triacetin | 49 | 25.3 | Transparent. Continuous. |

While the film forming properties are improved by the addition of plasticizer, and particularly when using Triacetin, still transparent and soft, waxy, films are not ideal tablet or other dosage coatings.

EXAMPLE 8

In addition to plasticizers, water soluble polymeric materials were also slowly added with gentle mixing and in various amounts to latices essentially as prepared in Example 1. The results are shown in Table II.

TABLE II

| Polymers Ratio | Water Soluble Polymer | Plasticizer | % Total Polymers | % Plasticizer Based on Polymer Weight | Film Characteristics |
|---|---|---|---|---|---|
| 1:1 | Methycellulose 50 cps | Propylene Glycol | 10.6 | 80 | Translucent, flexible. |
| 2:1 | Methycellulose 50 cps | Propylene Glycol | 13.0 | 92 | Translucent, hard and brittle |

TABLE II-continued

| Polymers Ratio | Water Soluble Polymer | Plasticizer | % Total Polymers | % Plasticizer Based on Polymer Weight | Film Characteristics |
|---|---|---|---|---|---|
| 3:1 | Methylcellulose 50 cps | Propylene Glycol | 18.88 | 69 | Translucent, hard and brittle. |
| 1:1<br>3:1<br>4:1<br>6:1 | Hydroxy propyl Methylcellulose<br><br>Methylcellulose cps | Triacetin | 20.0 | 25–50 | Transparent or translucent. Flexible. |
| 2:1<br>3:1<br>4:1 | Hydroxy Propyl Methylcellulose 15 cps | Glycerin + Triancetin | 20.0 | 50 | Translucent, flexible. |

From Table II, it is apparent that the film characteristics are substantially improved utilizing annealing agents in conjunction with plasticizers. Further it was found that such films displayed desirable dosage coating characteristics with regard to dissolution in gastric liquids, water absorportion, water barrier, properties and appearance. However, certain of the plasticizers, particularly glycerin, appear to evaporate in a matter of days. Triacetin plasticizers appear to be permanent.

EXAMPLE 9

To 1 part of a 24.5 percent ethyl cellulose latex also containing therein two parts of a 5 percent methycellulose annealing solution and between 25 to 50 percent triacetin placticizer was added 20 percent (on a weight to weight basis of total polymer) of titanium dioxide. Films were cast by evaporating the solvent at 30° C. on a glass substrate. The addition of the titanium dioxide improved general film quality substantially in that the films were flexible and tougher than similar films without the opacifying agent. Also, the appearance and texture of the film were also improved. The addition of titanium dioxide to similar formulations utilizing glycerin in place of the Triacetin decreased the "oily" surface appearance of the resulting films attributed to the presence of glycerin.

From the above results it becomes apparent that the latices of water insoluble polymers can be utilized to form excellent dosage coating compositions with the inclusion of plasticizers, annealing agents, particularly water soluble polymeric materials and various other essentially conventional constituents utilized generally with more conventional tablet coating compositions, such as opacifying agents, polishing agents, carnauba wax, chlorowax.

A particularly important quality of this invention will be appreciated with reference to Example 10.

EXAMPLE 10

In the manner essentially as set forth in Example 2, a number of latices were prepared utilizing, as a fixed portion, ten parts of ethyl cellulose, 10 cps, 1 part cetyl alcohol, and 0.5 parts of sodium lauryl sulphate. Varying amount of ethyl dichloride and water were employed, with the ethyl dichloride being present in the amount of 150 grams and water employed in the amount of 200 grams. Various solutions of between 20% to 30% by weight of ethyl cellulose relative to ethylene dichloride were prepared. After emulsification, the water and ethylene dichloride were removed from each sample until the resulting latex contained 34.5% ethyl cellulose in all instances. The viscosity of the ethyl cellulose in ethylene dichloride solutions increased rapidly from the 10,000 cps at 20% solutions, to 20,000 cps at the 30% solutions. Initially, the final viscosity of the latex after removing the organic solvent and some water to produce the 34.5% ethyl cellulose latex increased rapidly in viscosity, particularly at the 25% and the 27.5% solutions, but ultimately it was found that the 30% initial solution provided a final latex of relatively low viscosity, i.e. approaching that of the 20% initial solution and substantially below that of the 22.5% solutions. Investigation of the particle size disclosed that the 30% initial solution produced particles on the order of 5 to 10 microns in size which was substantially equivalent to the particle size and distribution of the 20% initial solution. This was surprising since the intermediate initial solutions, i.e. about 25% and 27.5%, produced less desirable latices having not only substantially greater particle size, i.e. up to 20 to 30 microns, but also a wider distribution of sizes. Thus it is preferred that the 30% initial solution be employed since the particle size is desirable and substantially less water need be removed to provide a latex of equivalent solids loading. Similar procedures may be employed to produce optimum initial solutions from other water insoluble polymers.

EXAMPLE 11

Four petri dishes containing Difco Nutrient Agar were processed as described below and stored for three days at 37° C. One milliliter samples of ethyl cellulose and cellulose acetate phthalate latices, substantially as prepared in Examples 2 and 3, were spread over the surface of the agar prior to storage of two of the dishes. The samples of the cellulose latices were between 1 and 1½ years old and had been repeatedly opened during this period. However, no growth appeared on the agar, indicating that the samples were completely devoid of bacterial contamination. An Eudragit latex was similarly cultured on another agar dish and produced heavy growth of bacteria during storage indicating contamination. Finally, a control dish containing agar was exposed to the air prior to storage and also developed growth.

Thus, though the latices, according to the instant invention, are aqueous vehicle formulations, and though for all practical purposes the organic solvents have been removed, the latices still display a most surprising resistance to bacteria and mold growth. On the other hand, other latices, such as Eudragits prepared by more conventional emulsion polymerization processes, were particularly prone to bacterial spoilage thereby requiring extremely careful handling. Though the precise reason for this quality of the instant invention is not entirely understood, it is believed to relate to the method of formation of the latex, i.e., initial dissolution in a water immiscible organic solvent, and then stripping the organic solvent to form the latex. Also, the smooth surface of the polymer particles in latex may not afford a favorable environment for growth of bacteria or molds. Systems employing cellulose polymers are preferred since these are known to have a greater resistance to bacteria and mold growth and thus enhance the desirable characteristics of the instant invention.

Certain additives, such as polyethylene glycol, preferably of a molecular weight 4,000 and 6,000, but operably between 400 and 20,000, may serve dual purposes. Such polyethylene glycols have been found to be desirable annealing agents while concurrently lending high gloss to resulting tablet coatings. In most instances, polyethylene glycol would replace but a part of the annealing agents discussed above. However, worthwhile results are obtained when one or two parts of the polyethylene glycol is included on the basis of about 5 parts of ethyl cellulose in a typical formulation.

In summary, the instant invention, while making use of components, constituents and individual procedures which per se have been heretofore employed in the formation of films, and occasionally for coating of tablets, provides unique results. For instance, while the water insoluble polymers employed in the instant invention may have heretofore been utilized in organosols for coating tablets, the instant invention provides for coating from latices. Many of the plasticizers, annealing agents, polishing agents, etc. have been heretofore employed with tablet coatings, but certainly not in conjunction with a latex of a water insoluble polymer which, in itself, is only marginally film forming. In no instance has there been any suggestion of a tablet coating composition utilizing an aqueous vehicle which is highly resistant to bacterial and mold growth. However, by combining the rather improbable pseudolatices, and more conventional additives, a dense, high gloss dosage coating may be formed which displays healing of initial coating imperfections upon application of subsequent layers. Such coatings display low water vapor transmission rates and are, depending upon the specific blend, suitable for gastric or enteric release. Of particular significance is the most surprising characteristic of being sterile and resistant to bacterial growth and mold growth, though utilizing a water vehicle. High ratios of coating materials to water may be obtained, thereby greatly facilitating the formation of dosage coatings without unduly subjecting the dosages to attack by water, or requiring a great number of individual coatings with substantial amounts of solvent to be driven off. Further, given the disclosure of the instant invention, the basic mechanism, i.e., direct or inversion emulsification in a continuous water phase of a water insoluble polymer dissolved in an organic solvent, and formation of a pseudolatex therefrom with further addition of appropriate plasticizers, annealing agents, polishing agents and other such conventional additives to form a coating, may be readily varied and tailored for specific uses employing relatively conventional skills of the art. Thus, the advantages in many respects, and particularly the very unusual resistance to bacterial growth and mold growth, are intrinsic in the process and composition and do not require deviations or compromises beyond the rather straight-forward formation of the pseudolatex.

While the processes, composition and resulting pharmaceutical dosage coatings disclosed and described herein constitute preferred forms of the instant invention, it is also to be understood that the invention is capable of applications with benefit of various changes, modifications and alterations without departing from the spirit of the invention, and that the invention is intended to be limited only by the scope of the following claims.

I claim:

1. A coating composition for pharmaceutical dosages comprising:
   a bacteria growth resistant aqueous dispersion of submicron average sized spherical particles formed of at least one water insoluble polymer selected the group consisting of ethyl cellulose, polyvinyl acetate phthalate, cellulose acetate phthalate, and hydroxy propyl methyl cellulose phthalate;
   at least one annealing agent in the form of a water soluble polymer;
   at least one plasticizer selected from the group consisting of propylene glycol, glycerin, glyceryl triacetate and polyethylene glycol;
   an emulsifying agent; and
   an emulsion stabilizer selected from the group consisting of cetyl alcohol and n-decane;
   the solids contents of the aqueous dispersion being at least 40 percent by weight.

2. A coating composition as set forth in claim 1 in which the water soluble polymer constituting the annealing agent is selected from the group consisting of hydroxypropyl cellulose, hydroxypropyl methylcellulose, methyl cellulose, methyl ethyl cellulose, polyvinylpyrrolidone and sodium carboxymethylcellulose.

3. A coating composition for pharmaceutical dosages as set forth in claim 1 in which the annealing agent is selected from the group consisting of hydroxypropyl cellulose, hydroxypropyl methylcellulose, methyl cellulose, methyl ethyl cellulose, polyvinylpyrrolidone, sodium carboxmethylcellulose, gums, carboxyvinyl polymer, hydroxyethyl cellulose, solium alginate, propylene glycol ester of alginic acid and polyvinyl alcohol.

4. A coating composition for pharmaceutical dosages as set forth in claim 1 in which the emulsifying agent comprises sodium lauryl sulfate.

5. A coating composition for pharmaceutical dosages as set forth in claim 1 in which at least one additive selected from the group consisting of quaternary ammonium halides, fatty alcohol ethoxylates, polyoxyethylene condensation products, polyglycerol esters of fatty acids, polyoxethylene sorbitan monolaurate, polyoxethylene sorbitan tristerarate, polyoxethylene sorbitan monostearate, polyoxyethylene sorbitan monooleate, propylene glycol mono and diesters of fats and fatty acids, sorbitan monstearate, beeswax, candelilla wax, carnauba wax, cocoa butter, fatty acids, monoglycerides, diglycerides, triglycerides, glycerol-lacto stearate, glycerol-lacto oleate, glycerol-lacto palmitate, glyceryl-lacto esters of fatty acids, lauric acid, lauryl alcohol, linoleic acid, octyl alcohol, chlorowax, octyl acetate, and paraffin as included in the dispersion.

6. A coating composition for pharmaceutical dosages, the composition comprising:

a bacteria growth resistant aqueous dispersion of submicron average sized spherical particles formed of ethyl cellulose;

at least one annealing agent in the form of a water soluble polymer;

at least one plasticizer selected from the group consisting of propylene glycol, glycerin, glyceryl triacetate and polyethylene glycol;

sodium lauryl sulfate emulsifying agent; and an emulsion stabilizer selected from the group consisting of cetyl alcohol and n-decane;

the solids contents of the aqueous dispersion being between 40 percent and 60 percent by weight.

* * * * *